United States Patent
Lecue et al.

(10) Patent No.: US 11,948,099 B2
(45) Date of Patent: *Apr. 2, 2024

(54) KNOWLEDGE GRAPH WEIGHTING DURING CHATBOT SESSIONS

(71) Applicant: Accenture Global Solutions Limited, Dublin (IE)

(72) Inventors: Freddy Lecue, Dublin (IE); Christophe Dominique Marie Gueret, Dublin (IE); Diarmuid John Cahalane, Cork (IE)

(73) Assignee: Accenture Global Solutions Limited, Dublin (IE)

( * ) Notice: Subject to any disclaimer, the term of this patent is extended or adjusted under 35 U.S.C. 154(b) by 327 days.

This patent is subject to a terminal disclaimer.

(21) Appl. No.: 17/460,674

(22) Filed: Aug. 30, 2021

(65) Prior Publication Data
US 2021/0390431 A1 Dec. 16, 2021

Related U.S. Application Data

(63) Continuation of application No. 16/117,181, filed on Aug. 30, 2018, now Pat. No. 11,126,919.

(51) Int. Cl.
*G06N 5/04* (2023.01)
*G06F 16/901* (2019.01)
*G06N 3/006* (2023.01)

(52) U.S. Cl.
CPC .......... *G06N 5/04* (2013.01); *G06F 16/9024* (2019.01); *G06N 3/006* (2013.01)

(58) Field of Classification Search
None
See application file for complete search history.

(56) References Cited

PUBLICATIONS

Oakley, Collaborative Machines to Enhance Human Capabilities, Intelligent Cognitive Assistants (ICA) Workshop Summary and Research Needs, Feb. 7, 2018, pp. 1-40 (Year: 2018).*
Mulang, et al., Matching Natural Language Relations to Knowledge Graph Properties for Question Answering, Semantics 2017, 2017, pp. 1-9 (Year: 2017).*
Yoo, et al., Automating the expansion of a knowledge graph, Expert Systems With Applications 141, 2020, pp. 1-10 (Year: 2020).*

* cited by examiner

*Primary Examiner* — Wilbert L Starks
(74) *Attorney, Agent, or Firm* — Fish & Richardson P.C.

(57) ABSTRACT

Implementations include providing, by the PKG platform, an initial knowledge graph based on user-specific data associated with a user, and a domain-specific knowledge graph, receiving, by the PKG platform, data representative of at least one answer provided from the user to a respective question, providing, by the PKG platform, an expanded knowledge graph based on the initial knowledge graph, the expanded knowledge graph including one or more nodes and respective edges based on the data, generating, by the PKG platform, a weighted knowledge graph based a groundtruth knowledge graph, and a targeted knowledge graph, the groundtruth knowledge graph including one or more true answers, and the targeted knowledge graph including the at least one answer provided from the user, and generating, by the PKG platform, the hyper-personalized knowledge graph (hpKG) based on the weighted knowledge graph, the hpKG being unique to the user within a domain.

33 Claims, 7 Drawing Sheets

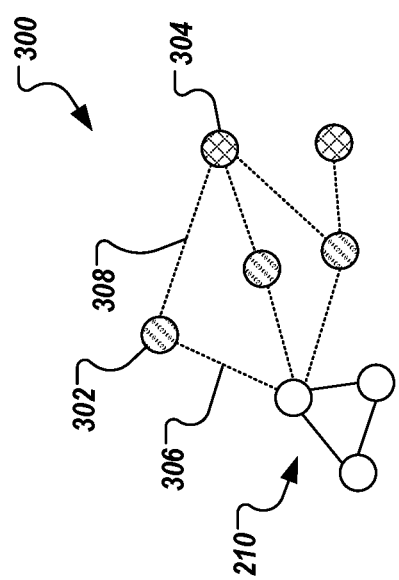
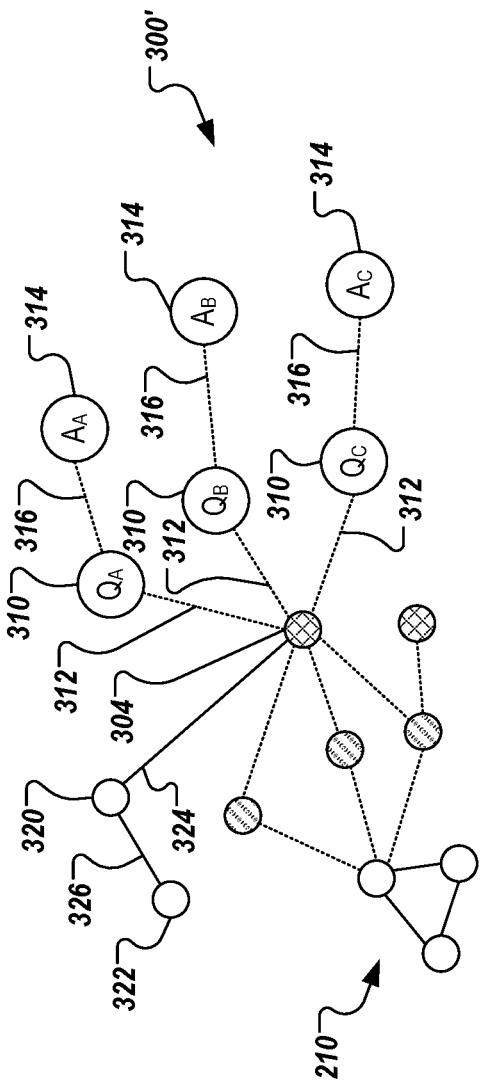
FIG. 3A
FIG. 3B

KNOWLEDGE GRAPH WEIGHTING DURING CHATBOT SESSIONS

CROSS-REFERENCE TO RELATED APPLICATIONS

This application is a continuation of U.S. patent application Ser. No. 16/117,181, entitled "KNOWLEDGE GRAPH WEIGHTING DURING CHATBOT SESSIONS," filed Aug. 30, 2018, which is incorporated herein by reference in its entirety.

BACKGROUND

Users (e.g., customers of an enterprise) can interact with automated systems in an effort to address issues, gather information, and/or use services. Such automated system have introduced automated services that enable users to drill-down through menus, for example, in an effort to focus resources to attend to a particular user (e.g., identify information that is suited to address the user's needs). Example automated services can include artificial intelligence that processes the user's spoken words to route the user through predefined scripts. Such automated systems, however, can have disadvantages. For example, although scripts may include decision trees, the decisions trees are static, and are generic to all users.

SUMMARY

Implementations of the present disclosure are generally directed to a computer-implemented personalized knowledge graph (PKG) for interacting with users. More particularly, implementations of the present disclosure are directed to PKG platform that can interact with a user to develop customized knowledge of a user using knowledge graph weighting.

In some implementations, actions include providing, by the PKG platform, an initial knowledge graph based on user-specific data associated with a user, and a domain-specific knowledge graph, receiving, by the PKG platform, data representative of at least one answer provided from the user to a respective question, providing, by the PKG platform, an expanded knowledge graph based on the initial knowledge graph, the expanded knowledge graph including one or more nodes and respective edges based on the data, generating, by the PKG platform, a weighted knowledge graph based a groundtruth knowledge graph, and a targeted knowledge graph, the groundtruth knowledge graph including one or more true answers, and the targeted knowledge graph including the at least one answer provided from the user, and generating, by the PKG platform, the hyper-personalized knowledge graph (hpKG) based on the weighted knowledge graph, the hpKG being unique to the user within a domain. Other implementations of this aspect include corresponding systems, apparatus, and computer programs, configured to perform the actions of the methods, encoded on computer storage devices.

These and other implementations can each optionally include one or more of the following features: actions further include identifying information in the domain-specific knowledge graph, and adding a node to the initial knowledge graph based on the identified information to provide the expanded knowledge graph; the groundtruth knowledge graph is generated based on the domain-specific knowledge graph; the groundtruth knowledge graph is generated by adding one or more nodes to the domain-specific knowledge graph; generating the weighted knowledge graph includes: converting the groundtruth knowledge graph to a multi-dimensional vector by graph embedding to provide one or more dimensional values for each node of the groundtruth knowledge graph, and applying at least a portion of the one or more dimensional values to the targeted knowledge graph to provide one or more weights for respective edges; a weight of the weighted knowledge graph is determined based on a correctness of the at least one answer determined from the groundtruth knowledge graph; the weighted knowledge graph includes a node and an edge that are included in the groundtruth knowledge graph, and that are absent from the targeted knowledge graph; the node represents a concept, and a question relating to the concept is transmitted to the user in a subsequent iteration; the hpKG is provided by integrating the weighted knowledge graph, and a context-based knowledge graph; actions further include iteratively questioning the user based on a set of questions including the respective question to provide a set of responses including the at least one response; and the data is received through one or more chatbot-based interactions with the user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 3A and 3B depict an example knowledge graph expansion in accordance with implementations of the present disclosure.

DETAILED DESCRIPTION

Implementations of the present disclosure are generally directed to a computer-implemented personalized knowledge graph (PKG) platform for interacting with users. More particularly, implementations of the present disclosure are directed to a PKG platform that can interact with a user to develop customized knowledge of a user using knowledge graph weighting. In some implementations, actions include providing, by the PKG platform, an initial knowledge graph based on user-specific data associated with a user, and a domain-specific knowledge graph, receiving, by the PKG platform, data representative of at least one answer provided from the user to a respective question, providing, by the PKG platform, an expanded knowledge graph based on the initial knowledge graph, the expanded knowledge graph including one or more nodes and respective edges based on the data, generating, by the PKG platform, a weighted knowledge graph based a groundtruth knowledge graph, and a targeted knowledge graph, the groundtruth knowledge graph including one or more true answers, and the targeted knowledge graph including the at least one answer provided from the user, and generating, by the PKG platform, the hyper-personalized knowledge graph (hpKG) based on the weighted knowledge graph, the hpKG being unique to the user within a domain.

Figure 1:
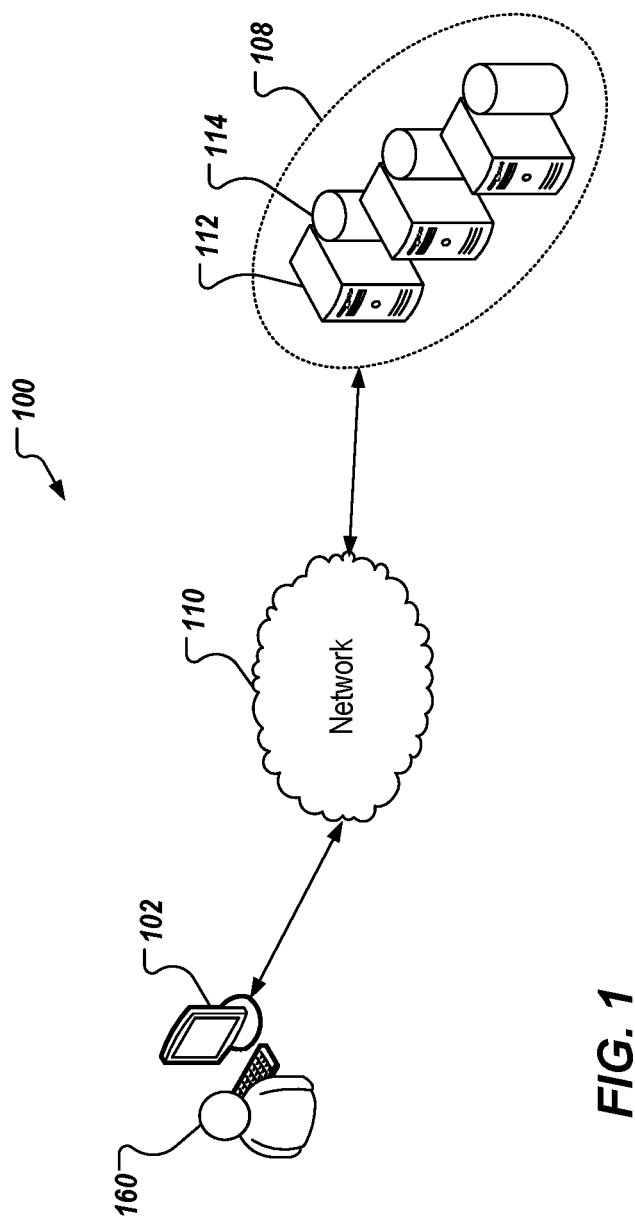
FIG. 1 depicts an example system that can execute implementations of the present disclosure.

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented PKG platform that can interact with a user to provide a hyper-personalized knowledge graph (hpKG) using knowledge graph weighting in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the back-end system 108 hosts a PKG platform that can interact with a user to provide a hpKG using knowledge graph weighting in accordance with implementations of the present disclosure. More particularly, and as described in further detail herein, the PKG platform starts with an initial knowledge graph, and iteratively questions the user through a channel (e.g., chat bot). The initial knowledge graph evolves (expands) based on answers that the user provides to questions. At each iteration, the knowledge graph is merged with a domain knowledge graph to provide a hpKG of the user with respect to one or more domains.

In some examples, a knowledge graph is a collection of data that is related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

Implementations of the present disclosure are described in further detail herein with reference to an example context. It is contemplated, however, that implementations of the present disclosure can be realized in any appropriate context. For purposes of non-limiting illustration, the example context includes a user interacting with an automated system as part of an interview process. The example context includes an example domain of computer programming. For example, the user is interviewing for a position as a software developer. In some examples, the user interacts with a PKG platform of the present disclosure through one or more channels. An example channel can include a so-called chat bot, which can be described as a digital agent that provides output to, and receives input from users. In some examples, the chat bot provides output (e.g., text, images, audible speech) to the user, and receives input (e.g., text, images, audible speech) from the user. In accordance with implementations of the present disclosure, and as described in further detail herein, the user receives questions from the chat bot, and provides answers to the chat bot, the answers being used to develop a hpKG for the user based on knowledge graph weighting.

Figure 2:
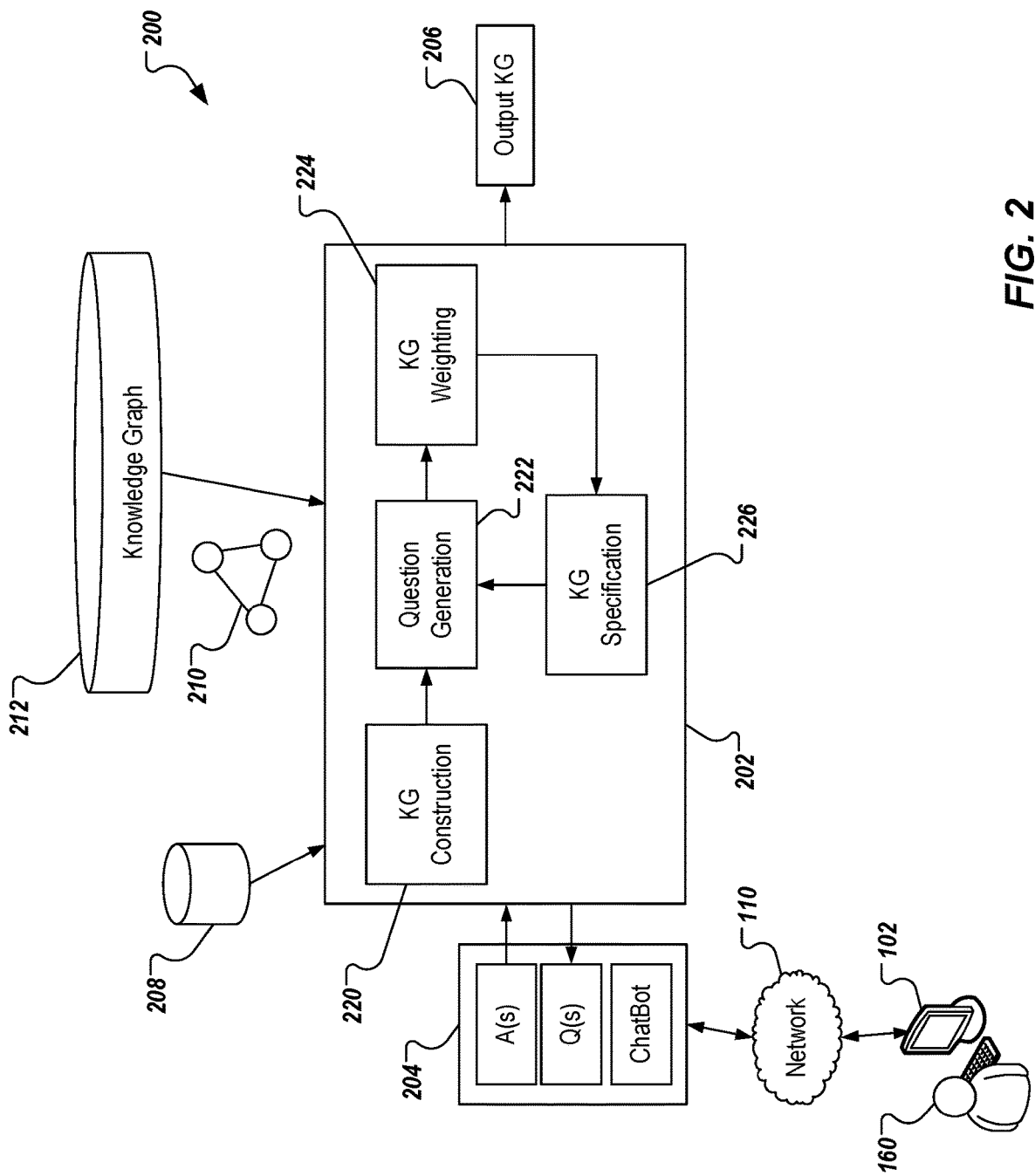
FIG. 2 depicts an example module architecture in accordance with implementations of the present disclosure.

FIG. 2 depicts an example module architecture 200 in accordance with implementations of the present disclosure. The example module architecture 200 includes a PKG platform 202, and a chat bot system 204. The PKG platform 202 receives interacts with the chat bot system 204 to provide questions to, and receive answers from the user, and provide an output knowledge graph 206 (e.g., hpKG). In some examples, the PKG platform 202 receives data from one or more data sources 208, and an initial knowledge graph 210 from a knowledge graph repository 212 to assist in developing the output knowledge graph 206.

In the depicted example, the PKG platform 202 includes a knowledge graph construction module 220, a question generation module 222, a knowledge graph weighting module 224, and a knowledge graph specification module 226. In some examples, the knowledge graph construction module 220 iteratively constructs a personalized knowledge graph based on the initial knowledge graph 210, and data that is specific to a subject user (e.g., the user 160), which can be referred to as user-specific data.

In some implementations, the initial knowledge graph 210 is provided based on one or more domains. An example domain includes computer programming, programming languages in particular. In some examples, the domain can be broad (e.g., programming languages generally). In some examples, the domain can be narrow (e.g., specific types of programming languages, such as object oriented programming (OOP) languages). In some examples, the initial knowledge graph can be representative of knowledge a user is expected to have. In the example context, and the example context of OOP languages, the initial knowledge graph can include a node for OOP, generally, and nodes for specific OOP languages (e.g., Java, C++, Ruby, Python). In the example context, the user 160 can be interviewing for a position as an OOP programmer. Consequently, the initial OOP can be representative of OOP, and various types of OOP languages.

In accordance with implementations of the present disclosure, initial user data is received. In some examples, the initial user data is received from the one or more data sources 208. In some examples, the one or more data sources 208 can include any appropriate data source, from which data specific to the user 160 can be provided. Example data sources can include public data sources (e.g., public information available from social media), and/or private data sources (e.g., a user profile of the user, digital resume provided by the user). In some examples, the initial user data relates to the one or more domains. With reference to the example context, the initial user data can include data indicating that the user 160 is able to program in one or more particular types of programming languages (e.g., C++, Java). In some implementations, the initial knowledge graph is expanded based on the initial user data. In some examples, one or more nodes can be added to the initial knowledge graph, and/or edges between nodes can be provided based on the initial user data.

FIGS. 3A and 3B depict an example expansion of a knowledge graph in accordance with implementations of the present disclosure. With particular reference to FIG. 3A, the initial knowledge graph 210 can be expanded based on the initial user data. In the depicted example, an expanded knowledge graph 300 is provided, which includes the initial knowledge graph 210 expanded to include nodes 302, 304 and edges 306, 308 based on the initial user data. For example, a node 304 can indicate that the particular user (e.g., the user 160) is familiar with C++, which is determined from the initial user data provided for the user.

In some implementations, in an initial iteration, the expanded knowledge graph 300 is provided as input to the question generation module 222. In some examples, the question generation module 222 processes the expanded knowledge graph 300 to determine one or more questions to be proposed to the user 160. In some examples, the questions can correspond to further detail of a concept represented by a node (e.g., the nodes 302, 304) of the expanded knowledge graph 300. Continuing with the example context, one or more questions can be determined to query the user's depth of experience with Java, as an OOP language. In some implementations, the question generation module 222 can provide questions based on a hierarchy of questions, described in further detail herein.

In some implementations, the one or more questions provided from the question generation module 222 are posed to the user 160. For example, the chat bot system 204 provides the one or more questions to the user 160, and the user 160 provides one or more responses, respectively. At least a portion of the one or more responses are used to further expand the expanded knowledge graph 300. As introduced above, and in accordance with implementations of the present disclosure, the user 160 interacts with the chat bot (e.g., through the computing device 102) to provide answers to questions. In some examples, the question generation module 222 provides the one or more questions to the chat bot system 204, which poses the questions to the user 160 (e.g., audibly, and/or visually). In some examples, the user 160 provides answers to the questions using the computing device 102 (e.g., speaking the answers, typing in the answers).

FIG. 3B depicts a further expanded knowledge graph 300' based on a set of questions [$Q_A$, $Q_B$, $Q_C$] proposed to the user 160, and a set of answers [$A_A$, $A_B$, $A_C$] to the respective questions. In some examples, each question is represented as a respective node 310, and includes an edge 312 relating the question to a concept (node) of the expanded knowledge graph 300. In the depicted example, all of the questions are related to the node 304 (e.g., all of the questions relate to C++). In some examples, each answer is represented as a respective node 314 that includes an edge 312 to the question that elicited the answer.

In the depicted example, the expanded knowledge graph 300' of FIG. 3B includes additional nodes 320, 322, and edges 324, 326. In some examples, the additional nodes 320, 322, and edges 324, 326 represent information provided from one or more additional KGs. In general, the additional nodes 320, 322, and edges 324, 326 provide information that could be interesting in the specific context of the profile being built. For instance, when speaking of C++, additional information related to Class-based programming can be provided from a relevant KG, and nodes, edges added to ask new questions.

In accordance with implementations of the present disclosure, weights are added to, or adjusted in the expanded knowledge graph at each iteration. For example, an initial iteration can include adding initial weights to the expanded knowledge graph based on the answers provided to the questions. As another example, a subsequent iteration can include adjusting weights of the expanded knowledge graph based on answers provided to subsequent questions.

In some implementations, a groundtruth knowledge graph is retrieved, and is used to determine an accuracy of answers provided in the expanded knowledge graph. In some implementations, the groundtruth knowledge graph is domain-specific (e.g., specific to OOP), includes questions posed to the user, and includes groundtruth answers to the questions. In some implementations, and as described in further detail herein, the user's answers to the questions are evaluated based on the groundtruth knowledge graph, and weights are determined to provide a weighted knowledge graph that is specific to the user.

Figure 4A:
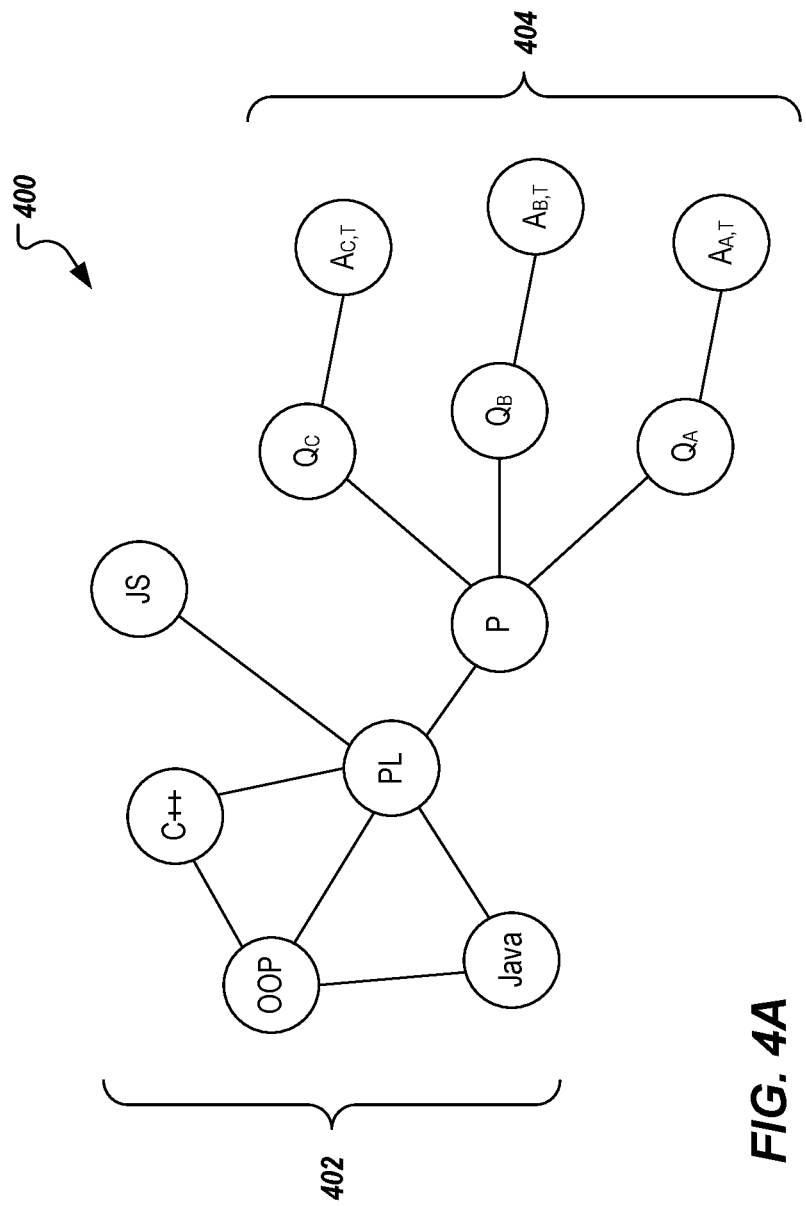
FIG. 4A depicts an example groundtruth knowledge graph in accordance with implementations of the present disclosure.

FIG. 4A depicts an example groundtruth knowledge graph 400 that corresponds to the example context introduced above. In the depicted example, the example groundtruth knowledge graph 400 includes a skills portion 402, and a questions/answers portion 404. In some examples, and in the example context, the skills portion 402 includes nodes, and edges between nodes representing skills a programmer (P) should have. In the depicted example, example skills include programming languages (PL), C++, OOP, Java, and Javascript. In some examples, and in the example context, the questions/answers portion 404 includes nodes, and edges between nodes representing questions that could be posed to a programmer regarding the skills in the skills portion 402, and true answers to the respective questions. In the example of FIG. 4A, the set of questions $[Q_A, Q_B, Q_C]$ posed to the user 160 are depicted, with a set of true answers $[A_{A,T}, A_{B,T}, A_{C,T}]$.

Figure 4B:
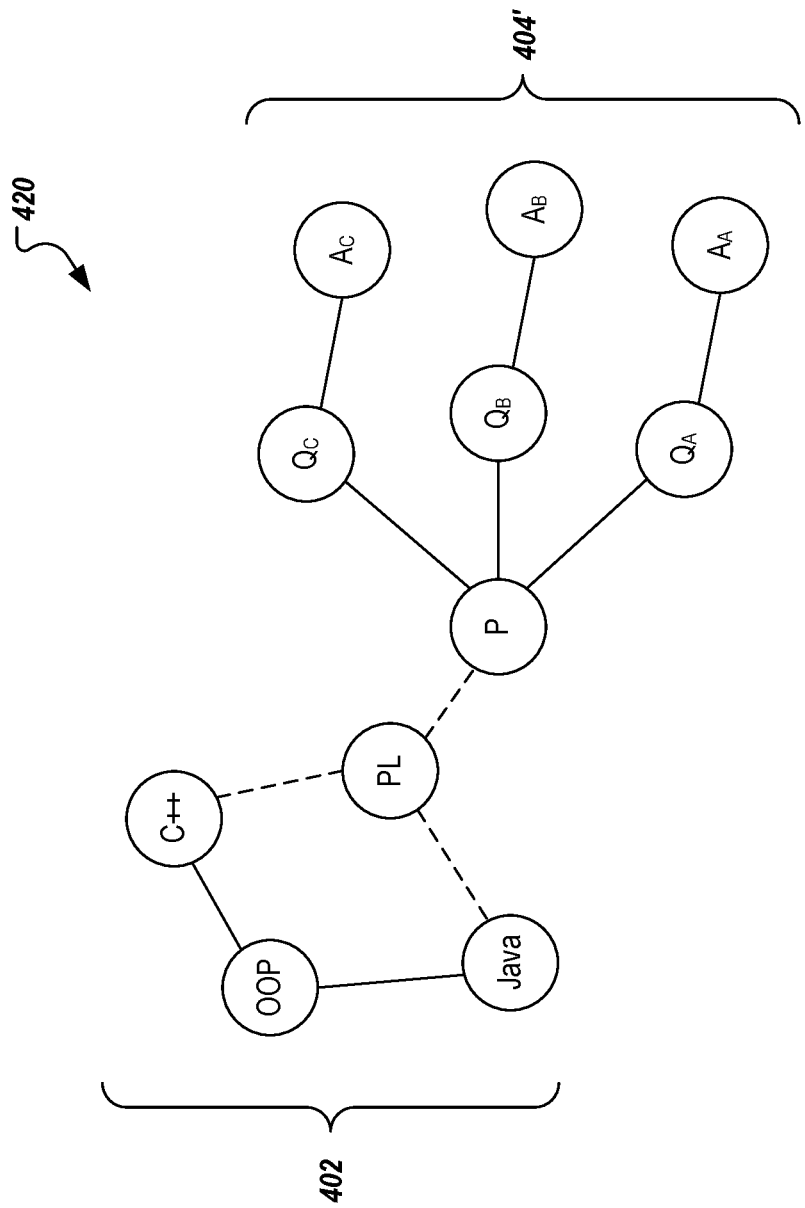
FIG. 4B depicts an example targeted knowledge graph in accordance with implementations of the present disclosure.

FIG. 4B depicts an example targeted knowledge graph 420 that corresponds to the example context introduced above, and the example groundtruth knowledge graph 400 of FIG. 4B. In the depicted example, the example targeted knowledge graph 420 includes the skills portion 402, and a user-specific questions/answers portion 404'. In some examples, and as described above with reference to FIG. 4A, the skills portion 402 includes nodes, and edges between nodes representing skills a programmer (P) should have. In the depicted example, example skills include programming languages (PL), C++, OOP, Java, and Javascript. In some examples, and in the example context, the user-specific questions/answers portion 404' includes nodes, and edges between nodes representing questions that were posed to the user 160 regarding the skills in the skills portion 402, and the actual answers to the respective questions that the user provided. In the example of FIG. 4B, the set of questions $[Q_A, Q_B, Q_C]$ posed to the user 160 are depicted, with a set of actual answers $[A_A, A_B, A_C]$. In some examples, the actual answers are provided from the expanded knowledge graph developed for the user 160 (see, e.g., FIGS. 3A and 3B).

In some implementations, the groundtruth knowledge graph is converted to a multi-dimensional, abstract space, in which, each node is assigned a value for each dimension. In some examples, conversion of the groundtruth knowledge graph to the multi-dimensional, abstract space is performed using graph embedding. In some examples, graph embedding converts a graph (e.g., a knowledge graph) into a multi-dimensional vector. In some examples, a dimensional value is determined for each node of the graph, the dimensional value representative of the node with respect to the respective dimension. Table 1, below, depicts an example conversion of the groundtruth knowledge graph 400 of FIG. 4 into n-dimensional space (e.g., n=150):

TABLE 1

| Example Dimension (d) Values | | | | |
|---|---|---|---|---|
| Node/Dimension | $d_1$ | $d_2$ | ... | $d_{150}$ |
| OOP | 0.5 | 1 | ... | −1 |
| C++ | 1 | 0.5 | ... | 0.2 |
| ... | ... | ... | ... | ... |

In accordance with implementations of the present disclosure, the graph embedding (provided from the groundtruth knowledge graph) is applied to the targeted knowledge graph to provide a weighted knowledge graph. More particularly, application of the graph embedding to the targeted knowledge graph enables weights to be determined for one or more edges between nodes of the targeted knowledge graph.

In some examples, a multi-dimensional vector space is used as a metric to measure the distance between nodes. A probability associated to an edge "P" ("predicate") connecting a subject "S" to an object "O" is determined. In some examples, starting at the position defined by a vector encoding of S, translate in this space according to the vector encoding of P, then move again according to the encoding of O. The final position is compared to the starting position. If those are equal the weight is 1, otherwise the score decreases with the distance. The values of the vector encoding of all the nodes and edges of the knowledge graph are computed so that all the (S,P,O) in the graph result in a return-to-origin move.

Figure 4C:
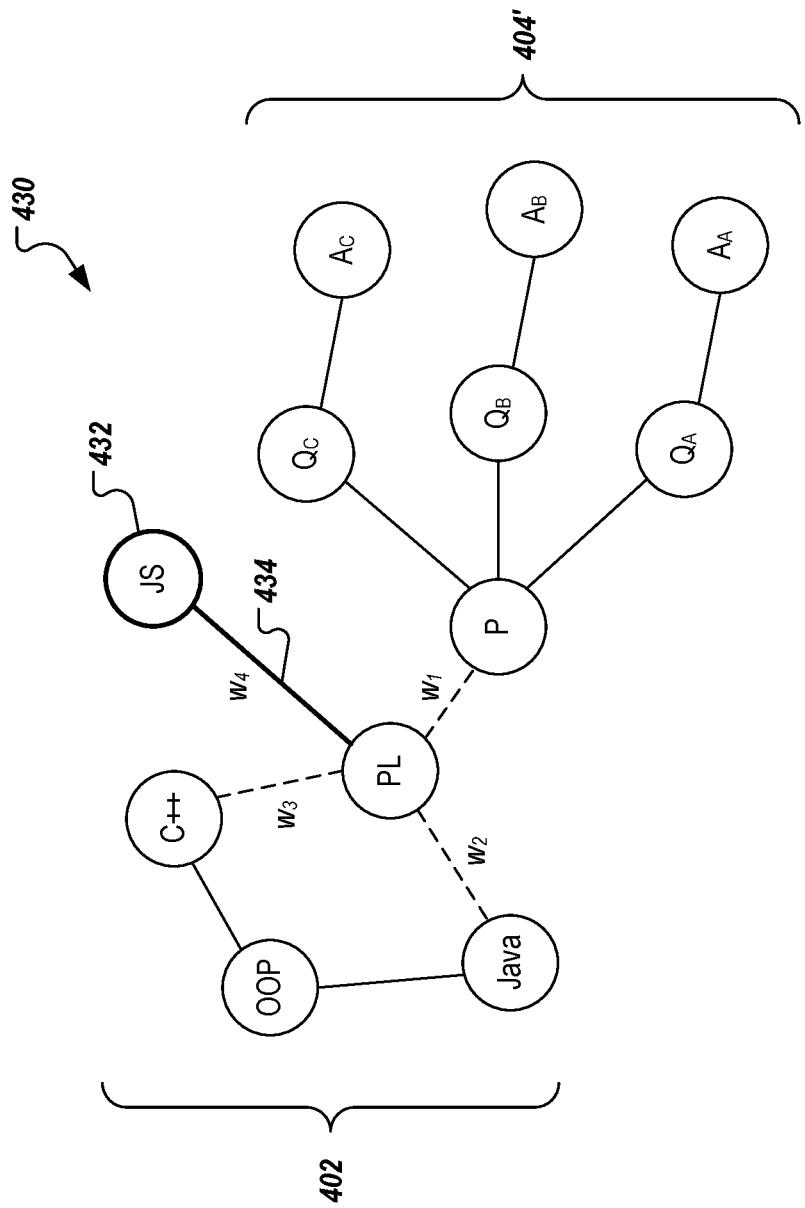
FIG. 4C depicts an example weighted knowledge graph in accordance with implementations of the present disclosure.

FIG. 4C depicts an example weighted knowledge graph 430 in accordance with implementations of the present disclosure. The example weighted knowledge graph 430 is provided by applying the graph embedding determined for the groundtruth knowledge graph 400 of FIG. 4A to the targeted knowledge graph 420 of FIG. 4B. More particularly, and in the depicted example, application of the graph embedding results in weights $[w_1, w_2, w_3]$ being determined for respective edges (e.g., $w_1=0.34$, $w_2=0.45$, $w_3=0.69$). In some examples, the weights are determined based on a correctness of each answer in the set of actual answers $[A_A, A_B, A_C]$ relative to respective true answers in the set of true answers $[A_{A,T}, A_{B,T}, A_{C,T}]$. In this manner, each of the weights represents a degree of knowledge the user 160 has with respect to a respective concept. For example, if the user answers Java to a question about relational databases, the actual answer does not correspond to the true answer, and the resulting weight may be relatively low. However, if the user answers SQL to a question about relational databases, the actual answer does correspond to the true answer, and the resulting weight may be relatively high.

In some implementations, one or more nodes, and respective edges can be added to the weighted knowledge graph based on the graph embedding. In some examples, the graph embedding can indicates that a relatively high likelihood that one or more concepts are known by the user based on one or more answers. In the example of FIG. 4C, a node 432 (e.g., representative of JavaScript), and edge 434 have been added, and a respective weight [$w_4$] is provided. In some examples, the node 432, and edge 434 are added in view of the groundtruth knowledge graph 400 of FIG. 4A even though the represented concept (e.g., JavaScript) is absent from the targeted knowledge graph 420 of FIG. 4B. In this example, the node 432 can be added based on the graph embedding space indicating that the user 160 likely also knows about JavaScript, in view of one or more previous answers (e.g., indicating knowledge of Java).

In some implementations, it can be determined that one or more additional questions are to be posed to the user 160. In some examples, additional questions can be posed based on one or more relatively low weights. For example, a weight that is below a threshold weight can indicate that the user 160 provided one or more incorrect answers with respect to a respective concept. In response, one or more additional questions can be posed to the user regarding the concept having incorrect answers. In some examples, additional questions can be posed based on a node and an edge that are added to the weighed knowledge graph (e.g., the node 432, and edge 434 of FIG. 4C). For example, and as described above, the graph embedding can indicate a concept that is likely to be known to the user, and, in response, add a node and edge to the weighted knowledge graph. In a next iteration, one or more questions can be posed to the user to determine how well the user knows about the concept.

In some implementations, a hierarchy of questions can be provided for a concept with progressively more detailed questions at each level in the hierarchy. In some examples, if it is determined that one or more additional questions is to be posed, one or more questions from a level of the hierarchy can be selected. For example, in an initial iteration, one or more questions for a concept (e.g., OOP) can be selected from a first level of the hierarchy. In a subsequent iteration, one or more questions for a concept can be selected from a next level of the hierarchy (e.g., a next more-detailed level of the hierarchy with respect to the level one or more previous questions were retrieved from).

By way of non-limiting example, the set of questions [$Q_A$, $Q_B$, $Q_C$] can be provided in a hierarchy of questions for a respective concept. In some examples, the question $Q_A$ can be provided at a first level of the hierarchy, the question $Q_B$ can be provided at a second level of the hierarchy, and the question $Q_C$ can be provided at a third level of the hierarchy. In some examples, in a first iteration, the question $Q_A$ is posed to the user, and the answer $A_A$ is received. It can be determined that another question is to be posed to the user (e.g., a weight determined based on the answer $A_A$ is below a threshold weight). Consequently, in a next iteration, the question $Q_B$ is posed to the user, and the answer $A_B$ is received. It can be determined that still another question is to be posed to the user (e.g., a weight determined based on the answers $A_A$ and $A_B$ is below a threshold weight). Consequently, in a next iteration, the question $Q_C$ is posed to the user, and the answer $A_C$ is received.

In some implementations, if all of the weights meet respective threshold weights, and no concepts have been added to the weighted knowledge graph, it can be determined that no further questioning is required. In some implementations, if one or more weights do not meet the respective threshold weights after multiple iterations, it can be determined that no further questioning on the respective concepts is to be conducted (e.g., all questions in the hierarchy of questions for the concept have been asked; the weight is sufficiently low to determine that the user is indeed not knowledgeable on the concept). In some implementations, the hpKG is provided in response to determining that no additional questions are to be posed to the user.

In accordance with implementations of the present disclosure, the hpKG for the particular user is provided based on the weighted knowledge graph (e.g., the weighted knowledge graph 430 of FIG. 4C), and a context-based knowledge graphs. In some examples, a database of context-based knowledge graphs is referenced, and a context-based knowledge graph is returned. In some examples, the hpKG is provided by integrating the context-based knowledge graph into the weighted knowledge graph. In some examples, the graphs are integrated based on overlaps in nodes. For example, the nodes have unique identifiers re-used across different graphs, this enables merging of nodes based on needs. In some examples, all nodes that are in direct relation to nodes found in both graphs (as an heuristic to avoid importing too much additional data) are integrated.

Figure 5:
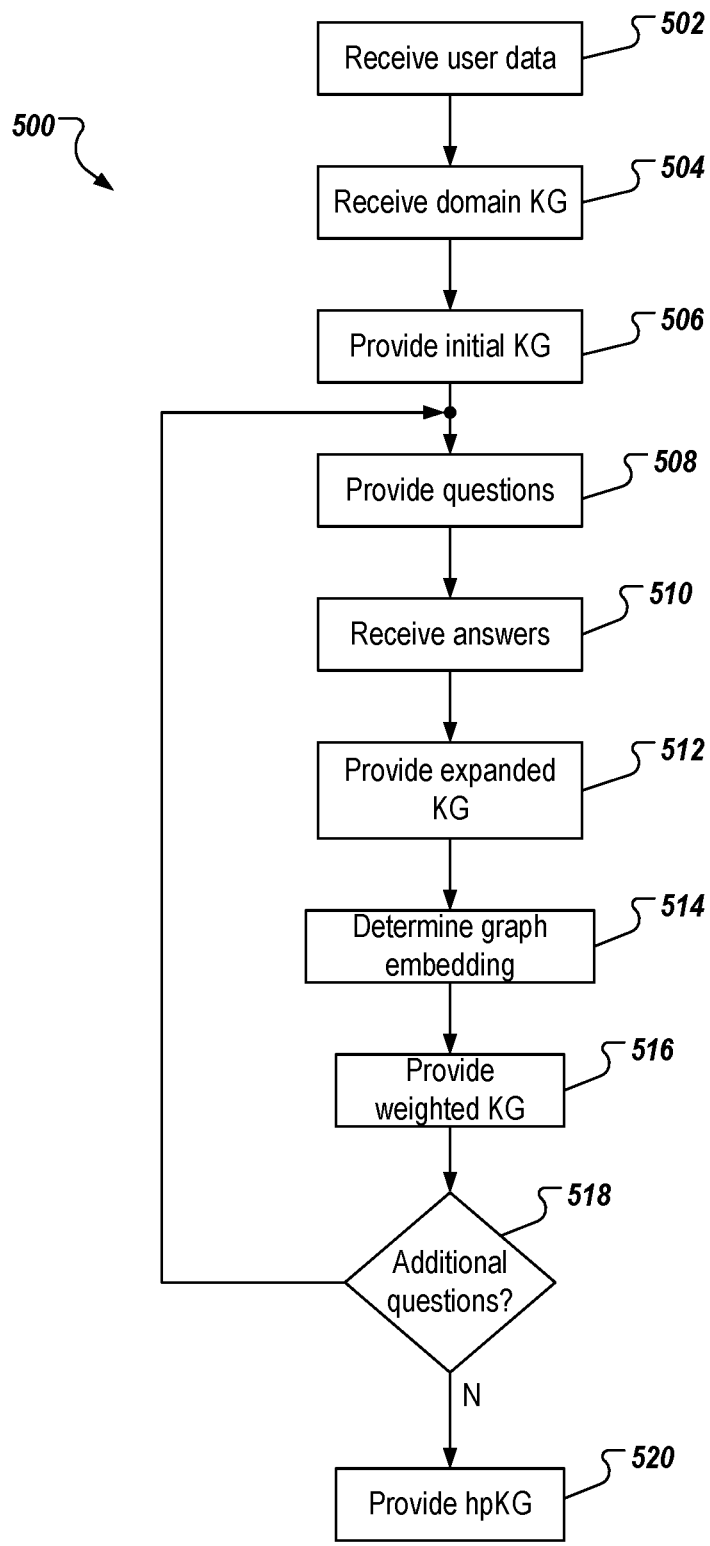
FIG. 5 depicts an example process that can be executed in accordance with implementations of the present disclosure.

FIG. 5 depicts an example process 500 that can be executed in implementations of the present disclosure. In some examples, the example process 500 is provided using one or more computer-executable programs executed by one or more computing devices (e.g., the back-end system 108 of FIG. 1). In some examples, the example process 500 is executed by a PKG platform to provide a hpKG for a particular user.

User data is received (502). For example, and as described herein, the user data can be received by the PKG platform 202 of FIG. 2 from the one or more data sources 208. In some examples, the one or more data sources 208 can include any appropriate data source, from which data specific to the user 160 can be provided. Example data sources can include public data sources (e.g., public information available from social media), and/or private data sources (e.g., a user profile of the user, digital resume provided by the user). In some examples, the initial user data relates to the one or more domains. An initial knowledge graph is received (504). For example, and as described herein, the initial knowledge graph 210 of FIG. 2 is provided based on one or more domains. An example domain includes computer programming, programming languages in particular. In some examples, the domain can be broad (e.g., programming languages generally). In some examples, the domain can be narrow (e.g., specific types of programming languages, such as object oriented programming (OOP) languages). In some examples, the initial knowledge graph can be representative of knowledge a user is expected to have. That is, for example, the initial knowledge graph can include skills that the user is expected to have in view of a particular role (e.g., programmer).

An initial expanded knowledge graph is provided (506). For example, and as described above, the initial knowledge graph 210 can be expanded based on the initial user data. A set of questions is provided (508), and a set of answers is received (510). For example, and as described above, a set of questions can be provided based on one or more concepts of the initial expanded knowledge graph. In some examples, questions can be provided based on a question hierarchy of a respective concept. In some implementations, the questions are posed to, and answers are received from the user through a chatbot system (e.g., the chatbot system 204 of FIG. 2).

An expanded knowledge graph is provided (512). For example, and as described herein with reference to FIGS. 3A and 3B, the initial expanded knowledge graph can be further expanded based on the answers provided from the user. A graph embedding is determined (514). For example, and as described herein, a groundtruth knowledge graph is provided, and graph embedding is used to determine a dimensional value for each node of the groundtruth knowledge graph for each of multiple dimensions. A targeted knowledge graph is provided, and weights for edges within the targeted knowledge graph are determined based on the dimensional values determined from the groundtruth knowledge graph. A weighted knowledge graph is provided (516). For example, weights of the targeted knowledge graph are provided for respective edges in the expanded knowledge graph to weight the expanded knowledge graph as the weighted knowledge graph.

It is determined whether additional questions are to be posed (518). For example, and as described herein, it can be determined whether further questions regarding a concept are needed based on a weight associated with the concept (e.g., the weight not meeting a threshold weight), and/or whether a new concept is introduced to the targeted knowledge graph in the weighting process. If additional questions are to be posed, the example process 500 loops back. If no additional questions are to be posed, the hpKG is provided as output (520).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors for providing a hyper-personalized knowledge graph using a personal knowledge graph (PKG) platform, the method comprising:
   providing an expanded knowledge graph based on an initial knowledge graph, the expanded knowledge graph comprising one or more nodes and respective edges based on data representative of at least one answer provided from a user to a respective question;
   generating a weighted knowledge graph based a groundtruth knowledge graph, and a targeted knowledge graph, the groundtruth knowledge graph comprising one or more true answers, and the targeted knowledge graph comprising the at least one answer provided from the user; and
   generating the hyper-personalized knowledge graph (hpKG) based on the weighted knowledge graph, the hpKG being unique to the user within a domain.

2. The method of claim 1, further comprising identifying information in a domain-specific knowledge graph, and adding a node to the initial knowledge graph based on the identified information to provide the expanded knowledge graph.

3. The method of claim 1, wherein the groundtruth knowledge graph is generated based on a domain-specific knowledge graph.

4. The method of claim 1, wherein the groundtruth knowledge graph is generated by adding one or more nodes to a domain-specific knowledge graph.

5. The method of claim 1, wherein generating the weighted knowledge graph comprises:
   converting the groundtruth knowledge graph to a multi-dimensional vector by graph embedding to provide one or more dimensional values for each node of the groundtruth knowledge graph; and
   applying at least a portion of the one or more dimensional values to the targeted knowledge graph to provide one or more weights for respective edges.

6. The method of claim 1, wherein a weight of the weighted knowledge graph is determined based on a correctness of the at least one answer determined from the groundtruth knowledge graph.

7. The method of claim 1, wherein the weighted knowledge graph comprises a node and an edge that are included in the groundtruth knowledge graph, and that are absent from the targeted knowledge graph.

8. The method of claim 7, wherein the node represents a concept, and a question relating to the concept is transmitted to the user in a subsequent iteration.

9. The method of claim 1, wherein the hpKG is provided by integrating the weighted knowledge graph, and a context-based knowledge graph.

10. The method of claim 1, further comprising iteratively questioning the user based on a set of questions comprising the respective question to provide a set of responses comprising the at least one response.

11. The method of claim 1, wherein the data is received through one or more chatbot-based interactions with the user.

12. A non-transitory computer-readable storage medium coupled to one or more processors and having instructions stored thereon which, when executed by the one or more processors, cause the one or more processors to perform operations for providing a hyper-personalized knowledge graph using a personal knowledge graph (PKG) platform, operations comprising:
   providing an expanded knowledge graph based on an initial knowledge graph, the expanded knowledge graph comprising one or more nodes and respective edges based on data representative of at least one answer provided from a user to a respective question;
   generating a weighted knowledge graph based a groundtruth knowledge graph, and a targeted knowledge graph, the groundtruth knowledge graph comprising one or more true answers, and the targeted knowledge graph comprising the at least one answer provided from the user; and
   generating the hyper-personalized knowledge graph (hpKG) based on the weighted knowledge graph, the hpKG being unique to the user within a domain.

13. The non-transitory computer-readable storage medium of claim 12, wherein operations further comprise identifying information in a domain-specific knowledge graph, and adding a node to the initial knowledge graph based on the identified information to provide the expanded knowledge graph.

14. The non-transitory computer-readable storage medium of claim 12, wherein the groundtruth knowledge graph is generated based on a domain-specific knowledge graph.

15. The non-transitory computer-readable storage medium of claim 12, wherein the groundtruth knowledge graph is generated by adding one or more nodes to a domain-specific knowledge graph.

16. The non-transitory computer-readable storage medium of claim 12, wherein generating the weighted knowledge graph comprises:
converting the groundtruth knowledge graph to a multi-dimensional vector by graph embedding to provide one or more dimensional values for each node of the groundtruth knowledge graph; and
applying at least a portion of the one or more dimensional values to the targeted knowledge graph to provide one or more weights for respective edges.

17. The non-transitory computer-readable storage medium of claim 12, wherein a weight of the weighted knowledge graph is determined based on a correctness of the at least one answer determined from the groundtruth knowledge graph.

18. The non-transitory computer-readable storage medium of claim 12, wherein the weighted knowledge graph comprises a node and an edge that are included in the groundtruth knowledge graph, and that are absent from the targeted knowledge graph.

19. The non-transitory computer-readable storage medium of claim 18, wherein the node represents a concept, and a question relating to the concept is transmitted to the user in a subsequent iteration.

20. The non-transitory computer-readable storage medium of claim 12, wherein the hpKG is provided by integrating the weighted knowledge graph, and a context-based knowledge graph.

21. The non-transitory computer-readable storage medium of claim 12, wherein operations further comprise iteratively questioning the user based on a set of questions comprising the respective question to provide a set of responses comprising the at least one response.

22. The non-transitory computer-readable storage medium of claim 12, wherein the data is received through one or more chatbot-based interactions with the user.

23. A system, comprising:
one or more processors; and
a computer-readable storage device coupled to the one or more processors and having instructions stored thereon which, when executed by the one or more processors, cause the one or more processors to perform operations for providing a hyper-personalized knowledge graph using a personal knowledge graph (PKG) platform, operations comprising:
providing an expanded knowledge graph based on an initial knowledge graph, the expanded knowledge graph comprising one or more nodes and respective edges based on data representative of at least one answer provided from a user to a respective question;
generating a weighted knowledge graph based a groundtruth knowledge graph, and a targeted knowledge graph, the groundtruth knowledge graph comprising one or more true answers, and the targeted knowledge graph comprising the at least one answer provided from the user; and
generating the hyper-personalized knowledge graph (hpKG) based on the weighted knowledge graph, the hpKG being unique to the user within a domain.

24. The system of claim 23, wherein operations further comprise identifying information in a domain-specific knowledge graph, and adding a node to the initial knowledge graph based on the identified information to provide the expanded knowledge graph.

25. The system of claim 23, wherein the groundtruth knowledge graph is generated based on a domain-specific knowledge graph.

26. The system of claim 23, wherein the groundtruth knowledge graph is generated by adding one or more nodes to a domain-specific knowledge graph.

27. The system of claim 23, wherein generating the weighted knowledge graph comprises:
converting the groundtruth knowledge graph to a multi-dimensional vector by graph embedding to provide one or more dimensional values for each node of the groundtruth knowledge graph; and
applying at least a portion of the one or more dimensional values to the targeted knowledge graph to provide one or more weights for respective edges.

28. The system of claim 23, wherein a weight of the weighted knowledge graph is determined based on a correctness of the at least one answer determined from the groundtruth knowledge graph.

29. The system of claim 23, wherein the weighted knowledge graph comprises a node and an edge that are included in the groundtruth knowledge graph, and that are absent from the targeted knowledge graph.

30. The system of claim 29, wherein the node represents a concept, and a question relating to the concept is transmitted to the user in a subsequent iteration.

31. The system of claim 23, wherein the hpKG is provided by integrating the weighted knowledge graph, and a context-based knowledge graph.

32. The system of claim 23, wherein operations further comprise iteratively questioning the user based on a set of questions comprising the respective question to provide a set of responses comprising the at least one response.

33. The system of claim 23, wherein the data is received through one or more chatbot-based interactions with the user.

* * * * *